United States Patent
Bender et al.

(10) Patent No.: US 6,998,549 B1
(45) Date of Patent: Feb. 14, 2006

(54) INTERLOCK ASSEMBLY AND SAFETY SWITCH EMPLOYING THE SAME

(75) Inventors: Douglas R. Bender, Cleveland, TN (US); Eddie D. Carson, Cleveland, TN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/078,180

(22) Filed: Mar. 11, 2005

(51) Int. Cl.
*H01H 33/46* (2006.01)
*H01H 9/20* (2006.01)

(52) U.S. Cl. .............................. 200/50.12; 200/50.21; 200/401; 200/48 R

(58) Field of Classification Search .. 200/50.12–50.24, 200/400–401, 48 R; 361/605–609, 615
See application file for complete search history.

(56) References Cited

U.S. PATENT DOCUMENTS

| | | | |
|---|---|---|---|
| 4,002,864 A | 1/1977 | Kuhn et al. | |
| 4,017,698 A | 4/1977 | Kuhn et al. | |
| 4,612,424 A * | 9/1986 | Clark et al. | ............. 200/50.18 |
| 4,728,757 A | 3/1988 | Buxton et al. | |
| 5,864,109 A * | 1/1999 | Ahn | ........................... 218/140 |
| 5,963,420 A | 10/1999 | Bailey et al. | |
| 6,031,192 A | 2/2000 | Liebetruth | |
| 6,066,814 A * | 5/2000 | Smith et al. | ............. 200/50.24 |
| 6,373,009 B1 | 4/2002 | Prohaska et al. | |
| 6,388,868 B1 | 5/2002 | Leccia et al. | |
| 6,445,570 B1 | 9/2002 | Leccia | |
| 6,545,859 B2 | 4/2003 | Leccia | |
| 6,870,114 B2 * | 3/2005 | Cole et al. | .................. 200/341 |

* cited by examiner

*Primary Examiner*—Kyung Lee
(74) *Attorney, Agent, or Firm*—Martin J. Moran

(57) ABSTRACT

An interlock assembly is for locking the operating assembly of a safety switch when the cover thereof is open or removed. The safety switch includes an enclosure with the cover and side walls. The operating assembly includes a bracket and a spring-toggle mechanism with a spring-biased drive link having an arm. An operating handle, which is coupled to the spring-biased drive link, operates the operating assembly. The interlock assembly includes a pivotal lever having a catch and a sensing portion. A pivot receives a blind rivet and pivotally couples the pivotal lever to the side wall. A torsion spring biases the pivotal lever toward engaging the arm of the spring-biased drive link in order that the catch engages and locks the arm when the cover of the enclosure is open. The sensing portion is engaged and pivoted by the cover when it is closed.

14 Claims, 6 Drawing Sheets

INTERLOCK ASSEMBLY AND SAFETY SWITCH EMPLOYING THE SAME

BACKGROUND OF THE INVENTION

1. Field of the Invention

The present invention relates generally to electrical switching apparatus and, more particularly, to an interlock assembly for safety switches. The invention also relates to safety switches employing an interlock assembly.

2. Background Information

Safety switches are used in electric power distribution systems in order to isolate a load or a portion of a power circuit.

General duty safety switches are used, for example, in applications where electrical current ranges from about 30 amperes through about 100 amperes.

For instance, general duty safety switches are commonly employed in residential and commercial applications and are suitable, for example, without limitation, for light duty motor circuits and service entrance applications.

FIGS. 1 and 2 show a representative general duty safety switch 2. As shown, the safety switch 2 generally includes a switch mechanism 4 housed within an enclosure, such as sheet metal cabinet 6, having a cover 8 (not shown in FIG. 2). The switch mechanism 4 has a number of switch blades 10,12,14 (three switch blades 10,12,14 are shown for 3-pole safety switch 2 of FIG. 2) mounted along a rotatable switch shaft 16. The shaft 16 is rotated by an operating handle 18 pivotally coupled on the outside surface of one side wall 20 of the enclosure 6 and coupled to the shaft 16 by a spring-toggle mechanism 22 on the inside surface of the side wall 20. The spring-toggle mechanism 22 provides a snap action to ensure that the safety switch 2 opens and closes rapidly when the handle 18 is actuated. A more detailed explanation of the components of a safety switch and operation thereof, is provided in U.S. Pat. No. 6,373,009 (disclosing a fail safe arrangement which assures positive operation of the switch spring-toggle mechanism).

As discussed in U.S. Pat. No. 6,373,009, each switch blade 10,12,14 has a first end and a second end. When the safety switch 2 is closed or in the ON position as shown in FIG. 2, the first ends each engage a corresponding line contact 24,26,28 while the second ends respectively engage corresponding load contacts 30,32,34. Line terminals 36,38,40 provide electrical connections between line conductors (not shown) and the respective line contacts 24,26,28. The load contacts 30,32,34 are electrically connected to a first set of fuse clips 42,44,46, respectively. Fuses 48 (only one fuse 48 is shown in FIG. 2) interconnect each of the first fuse clips 42,44,46 and the corresponding second fuse clips 50,52,54, which, in turn, are electrically connected to load terminals 56,58,60, respectively. The fuses 48 provide overcurrent protection.

The switch mechanism 4 is operated between the OFF (not shown) and ON (FIG. 2) positions by an operating assembly 62, best shown in FIG. 3. The operating assembly 62 includes a bracket 64 which is secured to the side wall 20 of the cabinet 6 by fasteners, such as screws 66. The screws 66 are received in indented portions 68,70 which space or offset the bracket 64 from the inner surface of the side wall 20. The bracket 64 includes an aperture 72 defining a pivot axis. The operating assembly 62 further includes the aforementioned spring-toggle mechanism 22 which has a U-shaped operating member 74 with first and second legs 76,78 extending from a base 80. The U-shaped operating member 74 pivots about the pivot axis in response to movement of the operating handle 18. Specifically, the base 80 of the U-shaped operating member 74 is coupled to an arm 82 on a drive link 84 by a spring 86 and is, therefore, spring-biased. The first leg 76 of the operating member 74 is pivotally disposed within the space defined between the offset bracket 64 and the inside surface of the cabinet side wall 20. The operating member 74, drive link 84 and operating handle 18 pivot about the pivot axis via a pivot pin 88 inserted through aperture 72. The operating handle 18 is partially covered by a shroud 90 within which it can pivot between the ON (FIG. 2) and OFF (not shown) positions. Accordingly, when the operating handle 18 is pivoted, the drive link 84 coupled thereto pivots causing the U-shaped operating member 74 to pivot and actuate the aforementioned switch mechanism 4.

The spring 86 between the U-shaped operating member 74 and the drive link 84 provides the aforementioned spring-bias to the operating assembly 62 in order to enable the nearly instantaneous response or snap-like reaction when the operating handle 18 is moved. Thus, the safety switch 2 can be actuated very quickly when necessary, for example, in order to overt a dangerous electrical condition. While the foregoing operating assembly, the spring-toggle mechanism therefor, and the snap action it affords represent significant achievements in the art, known safety switches continue to suffer from a unique set of disadvantages, one of which poses a potential safety threat.

Specifically, the design of most known 30–100 Ampere General Duty safety switches, for example, allows the switch mechanism to be operated when the enclosure cover or door is open. This presents a potential safety issue, wherein an operator could be exposed to the arcing or sparking typically produced when energizing or opening a circuit.

There is a need, therefore, for an improved safety switch which resists operation of the handle when the switch enclosure is open.

There is, therefore, room for improvement in safety switches.

SUMMARY OF THE INVENTION

These needs and others are satisfied by the present invention, which is directed to an interlock assembly for safety switches. The interlock assembly functions to resist operation of the safety switch when the enclosure housing the electrical components of the switch is open. The switch may only be operated with an open door or with the cover removed, when the interlock is manually overridden or defeated. Thus, by substantially eliminating improper operation of safety switches (e.g., arbitrarily activating the switch while the cover is open) and known safety hazards associated therewith, the present invention provides a significant and valuable safety feature.

As one aspect of the invention, an interlock assembly is for a safety switch housed within an enclosure having side walls and a cover. The safety switch includes an operating assembly with a bracket and a spring-toggle mechanism having a spring-biased drive link with an arm. The spring-biased drive link is coupled to an operating handle at a first one of the side walls. The interlock assembly comprises: a pivotal lever including a catch and a sensing portion, the catch being structured to engage and lock the arm of the spring-biased drive link when the cover of the enclosure is open, the sensing portion being structured to be engaged by the cover when it is closed; a pivot structured to pivotally couple the pivotal lever to the first one of the side walls of the enclosure; and a spring adapted to bias the pivotal lever toward engaging and locking the arm of the spring-biased drive link, wherein the cover of the enclosure is structured to engage the sensing portion of the pivotal lever when the cover is closed, causing it to pivot against the bias in order to disengage and unlock the arm and to unlock the spring-biased drive link.

The pivotal lever may further include an aperture and the pivot may include a shaft having a bore. The shaft may extend through the aperture and the bore may receive a fastener therethrough which is structured to pivotally secure the pivotal lever to the first one of the side walls. The spring may be a torsion spring having a first end and a second end. The first end of the torsion spring may engage another aperture of the pivotal lever and the second end may be structured to engage a portion of the bracket in order to provide the bias of the pivotal lever towards the arm of the spring-biased drive link.

The catch of the pivotal lever may be a hook with a barb. The hook may be structured to engage the arm of the spring-biased drive link and the barb may be structured to resist movement thereof.

The side wall of the enclosure may have an edge and the sensing portion of the pivotal lever may be a projection structured to project beyond the edge in order that the cover of the enclosure engages and deflects it when the cover is closed, thereby overcoming the bias and causing the pivotal lever to pivot and unlock the arm of the spring-biased drive link.

As another aspect of the invention, a safety switch comprises: an enclosure having side walls and a cover; an operating assembly at least partially housed within the enclosure, the operating assembly including a bracket and a spring-toggle mechanism, the spring-toggle mechanism including a spring-biased drive link having an arm; an operating handle for operating the operating assembly, the spring-biased drive link being coupled to the operating handle at a first one of the side walls; and an interlock assembly for locking the operating assembly when the cover of the enclosure is open, the interlock assembly comprising: a pivotal lever including a catch and a sensing portion, the catch engaging and locking the arm of the spring-biased drive link when the cover of the enclosure is open, the sensing portion being engaged by the cover when it is closed, a pivot pivotally coupling the pivotal lever to the first one of the side walls of the enclosure, and a spring biasing the pivotal lever toward engaging and locking the arm of the spring-biased drive link, wherein the cover of the enclosure engages the sensing portion of the pivotal lever when the cover is closed, causing it to pivot against the bias in order to disengage and unlock the arm and to unlock the spring-biased drive link.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
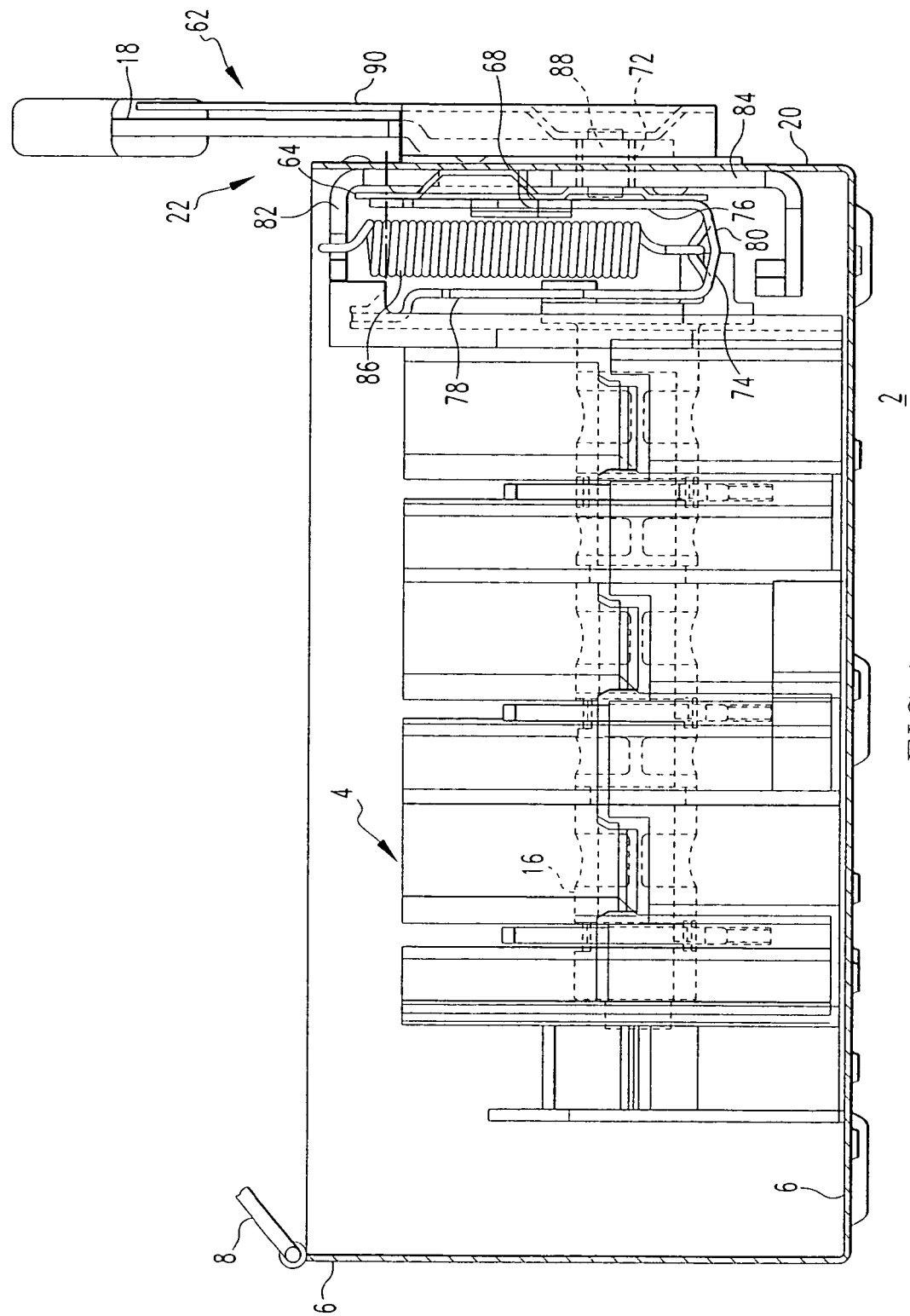
FIG. 1 is a bottom plan view of a general duty safety switch with the bottom end wall removed and a portion of the front cover cut away in order to show internal structures.

For purposes of illustration, the invention will be described as applied to an interlock for a general duty safety switch (e.g., 30–100 amp) housed within a covered enclosure, although it will become apparent that it could also be applied to other types of safety switches (e.g., without limitation, heavy duty safety switches and double throw safety switches) having an operating handle and an enclosure with a door or cover.

Directional phrases used herein, such as, for example, left, right, top, bottom, clockwise, counterclockwise and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

Figure 4:
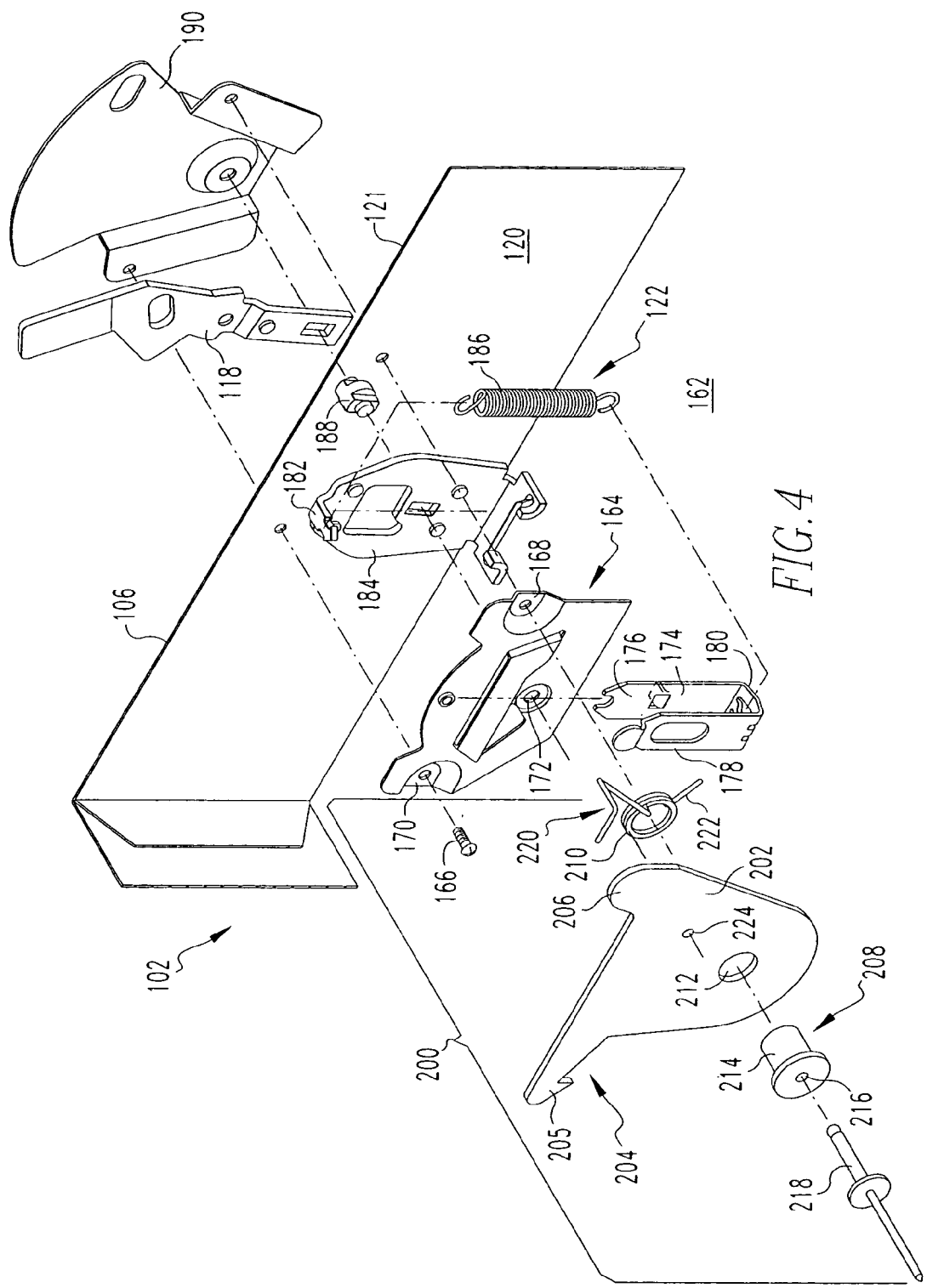
FIG. 4 is an exploded isometric view of an operating assembly of a general duty safety switch employing an interlock assembly in accordance with the present invention.
Figure 5:
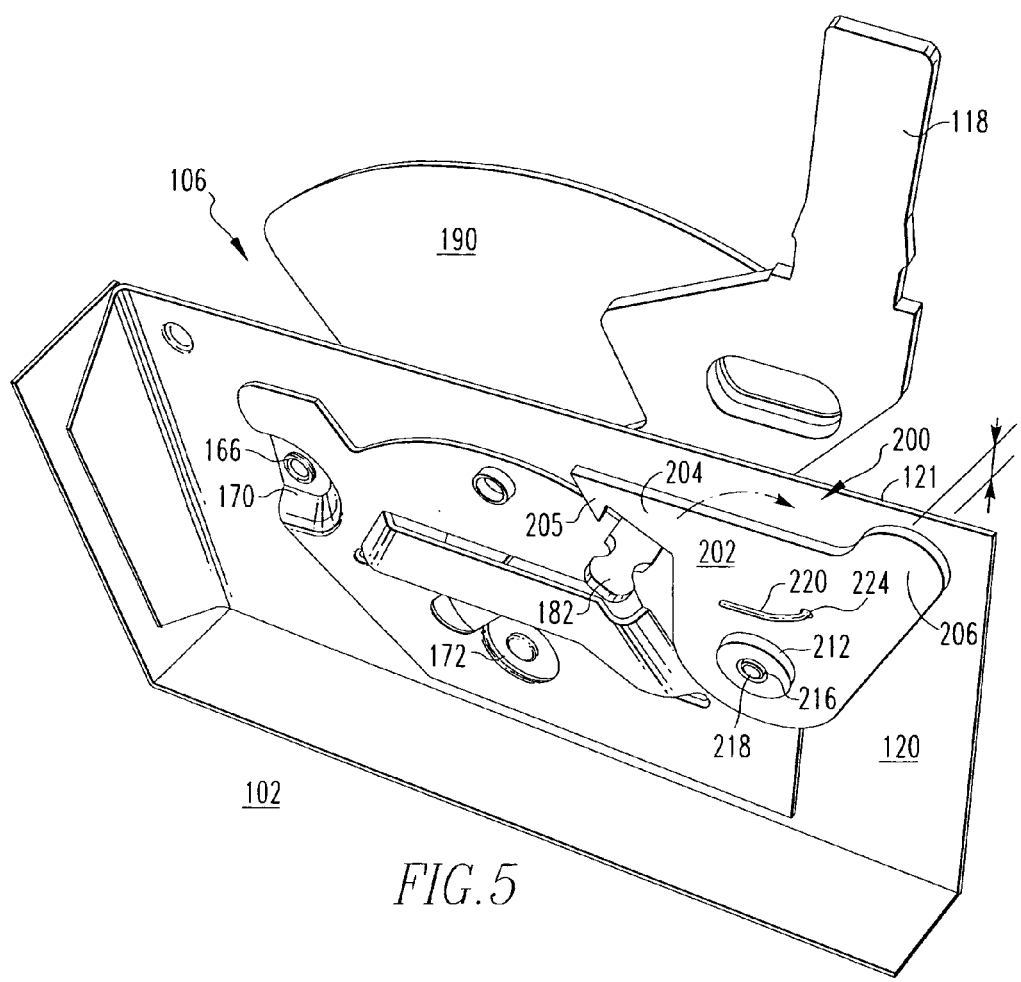
FIG. 5 is an isometric view of the operating assembly of FIG. 4 showing the interlock assembly as employed on the inside surface of a side wall of an enclosure, with certain components of the operating assembly removed to show greater detail.
Figure 6:
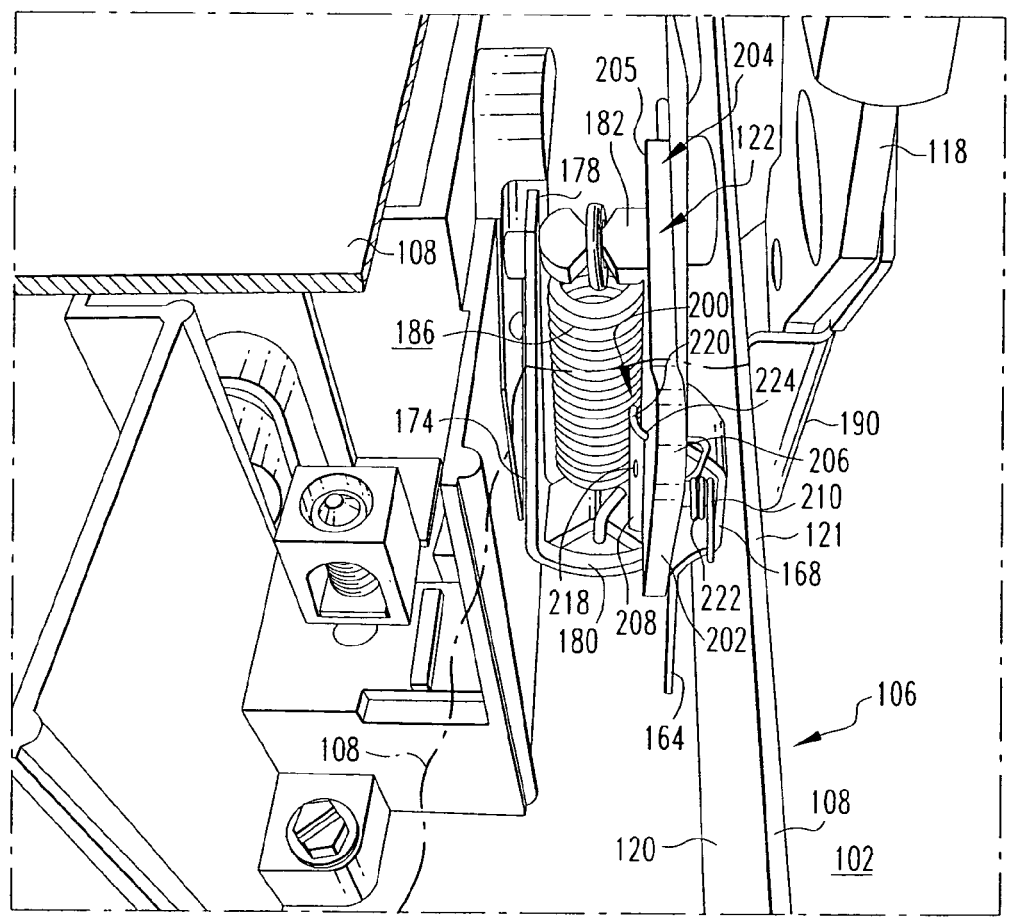
FIG. 6 is an isometric view of the operating assembly of FIG. 4, modified to show a portion of the enclosure cover in phantom line drawing engaging and unlocking the interlock assembly.

FIGS. 4–6 show a safety switch 102 with an operating assembly 162 (FIG. 4) including an interlock assembly 200 in accordance with the present invention. The exemplary safety switch 102 is a general duty safety switch housed within an enclosure 106 having a cover 108 (FIG. 6) and side walls (e.g. 120).

Figure 2:
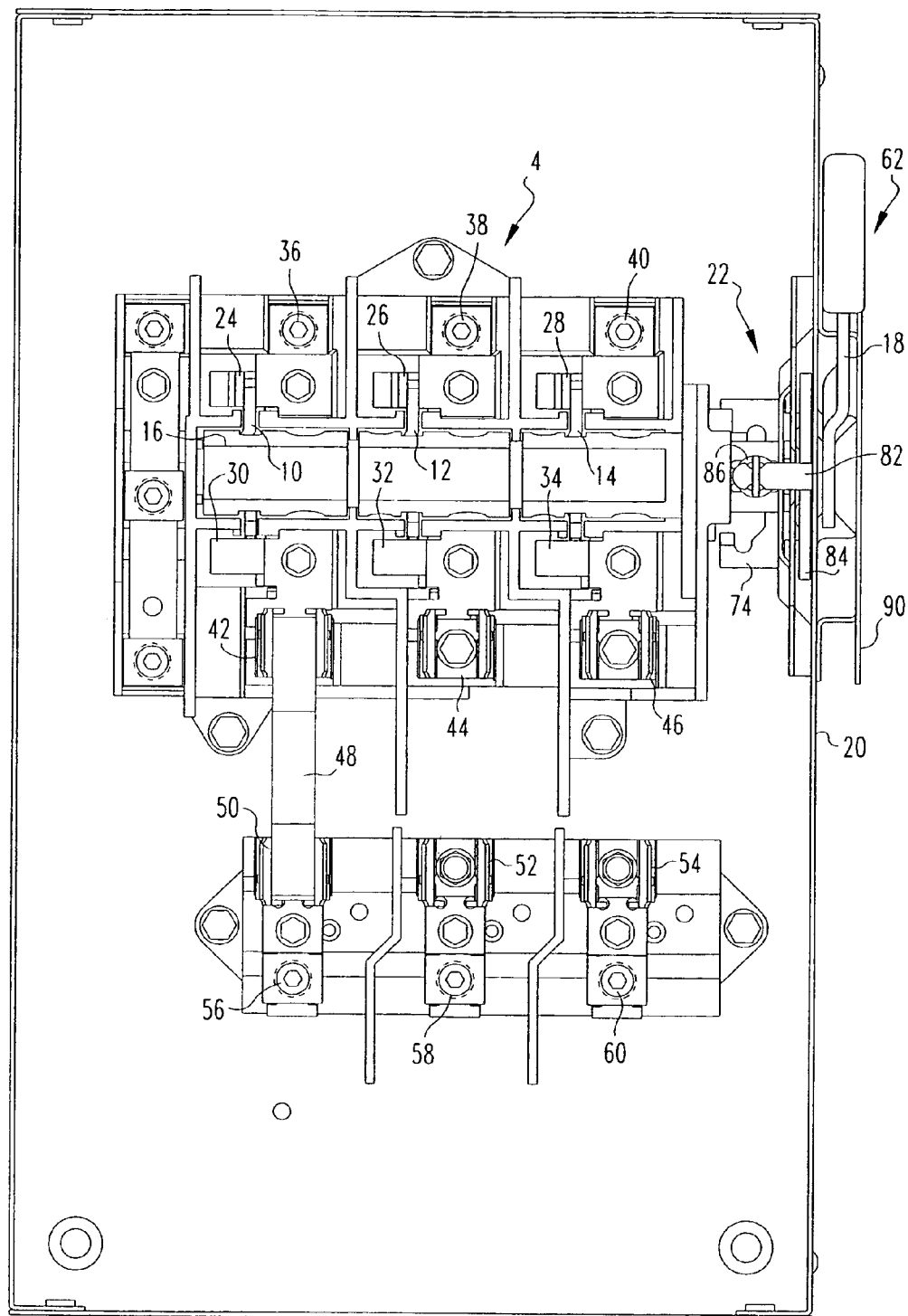
FIG. 2 is a vertical elevational view of the general duty safety switch of FIG. 1 modified to include the bottom end wall and to remove the front cover in order to show internal structures.
Figure 3:
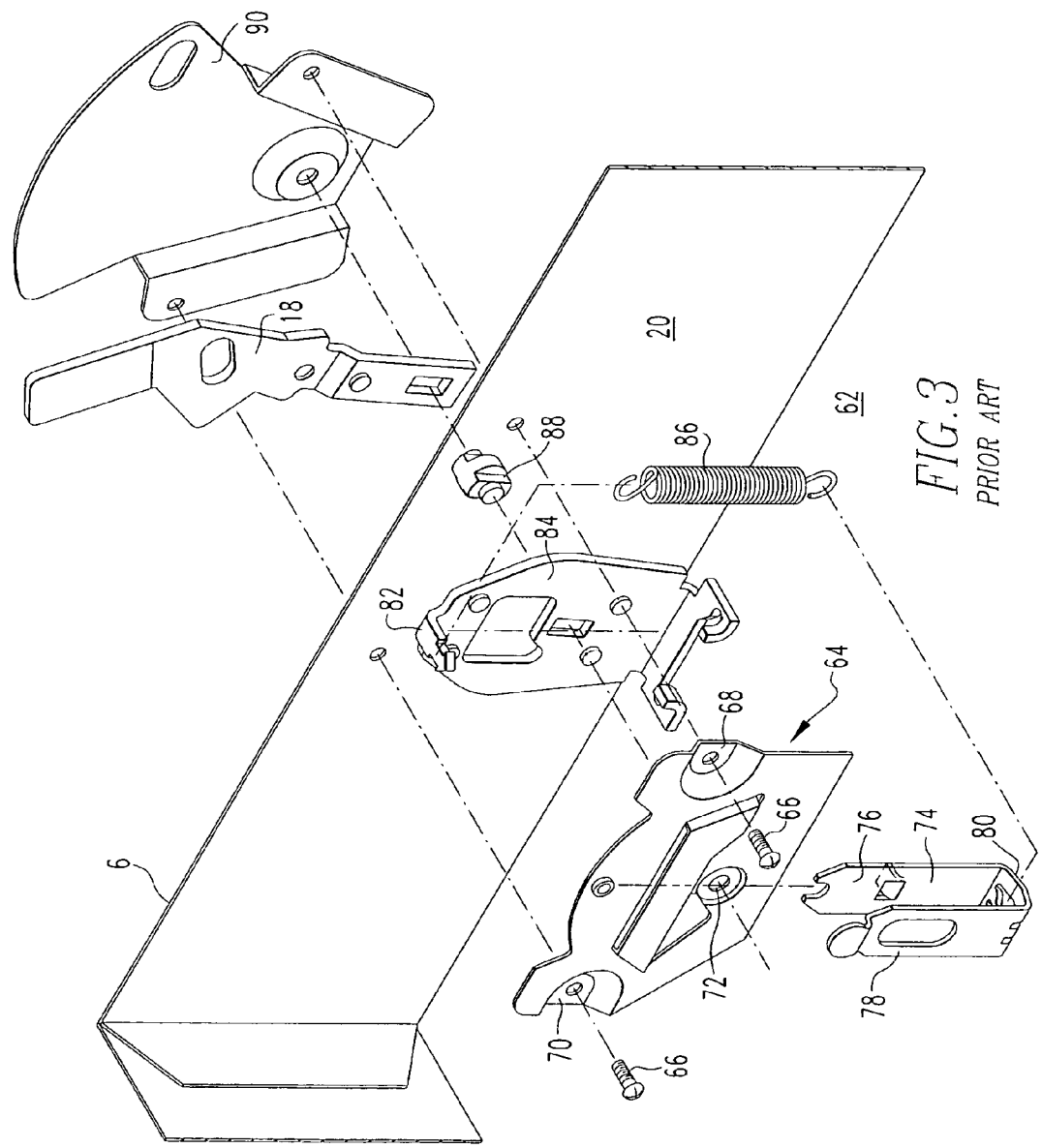
FIG. 3 is an exploded isometric view of the operating assembly for the general duty safety switch of FIG. 1.

Except for the interlock assembly 200, which will be described in detail herein, the operating assembly 162 is otherwise substantially similar in configuration and operation to operating assembly 62 of FIGS. 1–3. For example, spring-toggle mechanism 122 and arm 182, drive link 184 and pivot pin 188 thereof, correspond to spring-toggle mechanism 22, arm 82, drive link 84 and pivot pin 88; U-shaped operating member 174 and first and second legs 176,178 and base 180 thereof, correspond to U-shaped operating member 74, first and second legs 76,78 and base 80; bracket 164, indented portions 168,170 and aperture 172 thereof, and fastener 166 (e.g., screw) therefor correspond to bracket 64, indented portions 68,70, aperture 72 and fastener 66; handle 118 corresponds to handle 18; and shroud 190 corresponds to shroud 90 of FIGS. 1–3.

Similar to operating assembly 62, the operating assembly 162 in the example of FIGS. 4–6 is at least partially housed within the enclosure 106 and includes a bracket 164 and a spring-toggle mechanism 122 (shown in FIGS. 4 and 6) having a spring-biased drive link 184 with an arm 182. The spring-biased drive link 184 is coupled to operating handle 118 at side wall 120 of the enclosure 106. The remainder of the operating assembly 162 components, such as the U-shaped operating member 174, spring 186 and shroud 190 are substantially the same as the corresponding components (e.g., 74,86,90) illustrated and discussed previously with respect to FIGS. 1–3. However, as shown in the comparison of the exploded views of FIG. 3 and FIG. 4, the exemplary operating assembly 162 of the present invention further includes the interlock assembly 200, which is structured to lock the operating assembly 162 when cover 108 (FIG. 6) of the enclosure 106 is open or removed.

The interlock assembly 200 includes a pivotal lever 202 having a catch 204 and a sensing portion 206. The catch 204 is adapted to engage and lock the arm 182 of the spring-biased drive link 184 when the cover 108 of the enclosure 106 is open. The sensing portion 206 is structured to be engaged by the cover 108 when it is closed. More specifically, the interlock assembly 200 includes a pivot 208 which pivotally couples the pivotal lever 202 to side wall 120 of the enclosure 106. A spring, such as the exemplary torsional spring 210, biases the pivotal lever 202 toward engaging and locking the arm 182 of the spring-biased drive link 184. In operation, when the cover 108 of the enclosure 106 engages the sensing portion 206 of pivotal lever 202, for example, when the cover 108 is closed (FIG. 6), it causes the pivotal lever 202 to pivot about pivot 208, against this aforementioned bias, in order to disengage and unlock the arm 182 and to unlock the spring-biased drive link 184.

Continuing to refer to FIGS. 4–6, the pivotal lever 202 further includes at least one aperture 212,224. The exemplary pivotal lever 202 includes first and second apertures 212,224. The pivot 208, which pivotally secures the interlock assembly 200 to bracket 164, includes a shaft 214 having a bore 216. The shaft 214 extends through the exemplary first aperture 212 of the pivotal lever 202. The bore 216 of pivot 208 receives a fastener, such as a blind rivet 218, therethrough in order to pivotally secure the pivotal lever 202 to the side wall 120 of the enclosure 106. In the example shown in FIGS. 4–6, the pivotal lever 202 is coupled to side wall 120 at indented portion 168 of bracket 164. However, it will be appreciated that any known or suitable alternative mechanism (not shown) or configuration (not shown) for coupling the pivotal lever 202, could be employed.

The exemplary torsion spring 210 is disposed in the cavity created by indented portion 168 of bracket 164 and includes a first end 220 and a second end 222. The first end 220 of the torsion spring 210 engages the exemplary second aperture 224 of the pivotal lever 202. The second end 222 of torsion spring 210 engages a portion of the bracket 164 (best shown in FIG. 6), in order to provide the aforementioned bias of the pivotal lever 202 towards arm 182 of the spring-biased drive link 184.

As best shown in FIGS. 4 and 5, the exemplary catch of pivotal lever 202 is a hook 204 with a barb 205. The hook 204 engages the arm 182 of the spring-biased drive link 184 (best shown in FIG. 5) in accordance with the aforementioned bias, when the enclosure cover 108 (FIG. 6) is open. The barb 205 further resists movement of the arm 182. Accordingly, the handle 118 cannot be moved (e.g., pivoted counterclockwise with respect to FIG. 5) in order to energize the safety switch 102 when the cover 108 (FIG. 6) is open. In this manner, the present invention provides a significant safety feature which substantially eliminates the possibility of an operator becoming exposed to the normal arcing and sparking produced when energizing or opening a circuit, because it resists operation of the switch 102 when the cover 108 thereof is open or removed. It will be appreciated that any suitable pivotal lever configuration (not shown) other than the exemplary hook 204 and barb 205 arrangement shown and discussed herein, could alternatively be employed.

The side wall 120 of enclosure 106, to which the operating assembly 162 is pivotally coupled, includes an edge 121 (e.g., top surface 121 of side wall 120 in FIGS. 4–6). The exemplary sensing portion of the pivotal lever 202 is a projection 206 (best shown in FIG. 5), which projects beyond this edge 121 (best shown in FIG. 5) in order that the cover 108 (FIG. 6) of the enclosure 106 engages and deflects it when the cover 108 is closed. In this manner, the cover 108 provides a force on the pivotal lever 202, in particular, on the projection 206 thereof, sufficient to overcome the aforementioned bias and cause the pivotal lever 202 to pivot and unlock the arm 182 of the spring-biased drive link 184. Accordingly, the interlock assembly 200 of the present invention permits the operating assembly 162 and thus the safety switch 102 to be normally operated when the enclosure cover 108 (FIG. 6) is closed, but resists operation thereof when the cover 108 is open or removed.

It will be appreciated that any known or suitable alternative sensing portion (e.g., 206) configuration or structure other than the exemplary projection 206 shown and described herein, could be employed. It will also be appreciated that, while the exemplary interlock assembly 200 substantially resists operation of the operating assembly 162 when the safety switch cover 108 is opened or removed, that, if necessary, for example to inspect the operation of internal components of the operating assembly 162 (e.g., during routine maintenance when the safety switch 102 is not electrically connected to an external power supply), the pivotal lever 202 and the bias thereof, may be overcome or defeated by manually applying pressure to the sensing portion 206 in order that catch 204 releases arm 182 of spring-biased drive link 184 and permits movement thereof.

Accordingly, the present invention provides an interlock assembly 200 which may be readily incorporated with a variety of existing safety switch operating assemblies (e.g., without limitation, 62,162) in order to create a safety feature which substantially eliminates operation of the safety switch (e.g., 102) when the cover (e.g., 108) thereof is open or removed, and, therefore, substantially avoids the hazards associated therewith.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An interlock assembly for a safety switch housed within an enclosure having side walls and a cover, said safety switch including an operating assembly with a bracket and a spring-toggle mechanism having a spring-biased drive link with an arm, said spring-biased drive link being coupled to an operating handle at a first one of said side walls, said interlock assembly comprising:

a pivotal lever including a catch and a sensing portion, said catch structured to engage and lock said arm of said spring-biased drive link when said cover of said enclosure is open, said sensing portion structured to be engaged by said cover when it is closed;

a pivot structured to pivotally couple said pivotal lever to said first one of said side walls of said enclosure; and a spring adapted to bias said pivotal lever toward engaging and locking said arm of said spring-biased drive link, wherein said cover of said enclosure is structured to engage said sensing portion of said pivotal lever when said cover is closed, causing it to pivot against said bias in order to disengage and unlock said arm and to unlock said spring-biased drive link.

2. The interlock assembly of claim 1 wherein said pivotal lever further includes an aperture; wherein said pivot includes a shaft having a bore; wherein said shaft extends through said aperture; and wherein said bore receives a fastener therethrough which is structured to pivotally secure said pivotal lever to said first one of said side walls.

3. The interlock assembly of claim 2 wherein said fastener is a blind rivet.

4. The interlock assembly of claim 1 wherein said spring is a torsion spring having a first end and a second end; wherein said pivotal lever further includes an aperture; and wherein the first end of said torsion spring engages said aperture and the second end is structured to engage a portion of said bracket in order to provide said bias of said pivotal lever towards said arm of said spring-biased drive link.

5. The interlock assembly of claim 1 wherein said catch is a hook with a barb; wherein said hook is structured to engage said arm of said spring-biased drive link; and wherein said barb is structured to resist movement thereof.

6. The interlock assembly of claim 1 wherein said first one of said side walls of said enclosure has an edge; and wherein said sensing portion of said pivotal lever is a projection structured to project beyond said edge in order that said cover of said enclosure engages and deflects it when said cover is closed, thereby overcoming said bias and causing said pivotal lever to pivot and unlock said arm of said spring-biased drive link.

7. The interlock assembly of claim 1 wherein said safety switch is a 30–100 Ampere General Duty Safety Switch.

8. A safety switch comprising:

an enclosure having side walls and a cover;

an operating assembly at least partially housed within said enclosure, said operating assembly including a bracket and a spring-toggle mechanism, said spring-toggle mechanism including a spring-biased drive link having an arm;

an operating handle for operating said operating assembly, said spring-biased drive link being coupled to said operating handle at a first one of said side walls; and an interlock assembly for locking said operating assembly when said cover of said enclosure is open, said interlock assembly comprising:

a pivotal lever including a catch and a sensing portion, said catch engaging and locking said arm of said spring-biased drive link when said cover of said enclosure is open, said sensing portion being engaged by said cover when it is closed, a pivot pivotally coupling said pivotal lever to said first one of said side walls of said enclosure, and a spring biasing said pivotal lever toward engaging and locking said arm of said spring-biased drive link, wherein said cover of said enclosure engages said sensing portion of said pivotal lever when said cover is closed, causing it to pivot against said bias in order to disengage and unlock said arm and to unlock said spring-biased drive link.

9. The safety switch of claim 8 wherein said pivotal lever further includes an aperture; wherein said pivot includes a shaft having a bore; wherein said shaft extends through said aperture; and wherein said bore receives a fastener therethrough in order to pivotally secure said pivotal lever to said first one of said side walls.

10. The safety switch of claim 9 wherein said fastener is a blind rivet.

11. The safety switch of claim 8 wherein said spring is a torsion spring having a first end and a second end; wherein said pivotal lever includes an aperture; and wherein the first end of said torsion spring engages said aperture and the second end engages a portion of said bracket in order to provide said bias of said pivotal lever towards said arm of said spring-biased drive link.

12. The safety switch of claim 8 wherein said catch is a hook with a barb; wherein said hook engages said arm of said spring-biased drive link; and wherein said barb resists movement thereof.

13. The safety switch of claim 8 wherein said first one of said side walls of said enclosure has an edge; and wherein said sensing portion of said pivotal lever is a projection projecting beyond said edge in order that said cover of said enclosure engages and deflects it when said cover is closed, thereby overcoming said bias and causing said pivotal lever to pivot and unlock said arm of said spring-biased drive link.

14. The safety switch of claim 8 wherein said safety switch is a 30–100 Ampere General Duty Safety Switch.

* * * * *